(12) United States Patent
Hänel

(10) Patent No.: US 6,450,598 B1
(45) Date of Patent: Sep. 17, 2002

(54) STORAGE AND RETRIEVAL SYSTEM

(75) Inventor: Michael Hänel, Bad Friedrichshall (DE)

(73) Assignee: Hanel & Co., Altstatten (CH)

( * ) Notice: Subject to any disclaimer, the term of this patent is extended or adjusted under 35 U.S.C. 154(b) by 8 days.

(21) Appl. No.: 09/592,638

(22) Filed: Jun. 13, 2000

(30) Foreign Application Priority Data

Jun. 15, 1999 (DE) .......................................... 199 27 248

(51) Int. Cl.$^7$ ................................................ A47B 49/00
(52) U.S. Cl. .................... 312/268; 312/297; 312/97; 312/310; 160/117; 160/122
(58) Field of Search ................... 312/266, 267, 312/268, 297, 97, 97.1, 139.2, 139, 291, 273, 304, 307, 319.7, 295, 299, 310; 160/120, 122, 117, 118, 119; 221/119, 120, 122, 253

(56) References Cited

U.S. PATENT DOCUMENTS

| 2,125,619 A | * | 8/1938 | Parent .................... 312/297 X |
| 2,200,329 A | * | 5/1940 | Derman ................... 312/297 X |
| 2,206,347 A | * | 7/1940 | Derman ................... 312/297 X |
| 2,592,038 A | * | 4/1952 | Kimsey .................. 312/135 X |
| 2,597,267 A | * | 5/1952 | Shoemaker et al. ..... 312/297 X |
| 3,034,574 A | * | 5/1962 | Gerold .................... 160/118 X |
| 3,240,546 A | * | 3/1966 | Gibbons ..................... 312/267 |
| 3,851,764 A | * | 12/1974 | Anders .................... 312/268 X |
| 4,340,263 A | * | 7/1982 | Webb ..................... 312/268 X |
| 4,753,343 A | * | 6/1988 | Flynn .................... 312/297 X |
| 5,538,065 A | * | 7/1996 | Geraud .................. 160/120 X |
| 5,605,185 A | * | 2/1997 | McKeon ................. 160/120 X |
| 5,820,237 A | * | 10/1998 | Robey ........................ 312/268 |

FOREIGN PATENT DOCUMENTS

| DE | 3610347 | * | 10/1987 | ................. 312/268 |
| EP | 0499276 | * | 2/1992 | .................. 312/35 |
| GB | 2172881 | * | 10/1986 | ................. 312/268 |

* cited by examiner

Primary Examiner—Lanna Mai
Assistant Examiner—Hanh V. Tran
(74) Attorney, Agent, or Firm—Stephen B. Salai, Esq.; Brian B. Shaw, Esq.; Harter, Secrest & Emery LLP

(57) ABSTRACT

A storage and retrieval system (10) includes a housing (11) accommodating a plurality of carriers (12). These are assignable y a transport device (13) to at least one access opening (14) provided in the housing (11). Provided at the access opening (14) is a closing device (17) comprising at least two closing elements (18a, 18b) arranged opposite each other which can be shifted horizontally and signalled dedicated to thus form an access window (16) in the access opening (14) by an uncomplicated structural design.

7 Claims, 2 Drawing Sheets

STORAGE AND RETRIEVAL SYSTEM

The invention relates to a storage and retrieval system including a housing accommodating a plurality of carriers movable by means of a transport device to at least one access opening provided in the housing and including a closing means arranged at the access opening for defining an access window.

One such storage and retrieval system is known from U.S. Pat. No. 5,820,237. In this known storage and retrieval system the carriers accommodating the stored items are circulated by the transport device in the housing. Provided at the access opening in the housing is a plurality of vertically movable doors, each of which can be signalled dedicated so that only a dedicated access window of the access opening is formed as a function of authorized access to thus prohibit unauthorized access.

A similar storage and retrieval system is know from U.S. Pat. No. 5,836,662 the doors of which provided at the access opening can be hinged out of the way about a horizontal axis.

Due to the plurality of doors needing to be separately actuated and signalled, the storage and retrieval systems as described above are complicated in structural design, involving high manufacturing costs.

The invention is based on the object of proposing a storage and retrieval system permitting controlled access with an uncomplicated structural design.

To achieve this object a storage and retrieval system of the aforementioned kind is proposed in which the closing means comprises at least two closing elements arranged opposite each other which can be shifted horizontally and is separately controlled.

Since the closing means in accordance with a first embodiment of the invention comprises merely two horizontally shiftable closing elements which form a dedicated access window at the access opening of the storage and retrieval system as a function of how they are controlled, an uncomplicated structural design is achieved. Since the closing elements can be infinitely adjusted horizontally the access window can be precisely controlled. To advantage each closing element comprises a linear drive connected to a position sensor. The closing means in accordance with the invention is compatible both with storage and retrieval systems having circulating carriers and with storage and retrieval systems incorporating other means for transporting the carriers. Several access openings may be provided in the storage and retrieval system in accordance with the invention, for example, at the front and rear side of the housing.

Advantageous aspects of the invention read from the sub-claims.

Advantageously, each closing element is assigned a separate drive unit. Since only a small number of closing elements is needed, the number of drive units needed is likewise small.

Advantageously, each closing element is guided on a horizontal guide provided at the access opening.

In accordance with an advantageous embodiment the closing element is configured as a roller shutter, the slats of which may be made of aluminium, for example.

Advantageously, a winder mechanism for each roller shutter is arranged at the sides of the access opening, the winder mechanism being expediently concealed by a cover plate.

In another embodiment the closing element is configured as a telescopic metal plate.

Advantageously, the closing element comprises a viewing window at least partially. The closing element may also be made of a see-thru material.

In another advantageous aspect the closing means is provided with at least one vertically travelling door fronting the at least two horizontally travelling closing elements to thus enable the access window to be defined also in its height. At the same time the fronting door, made to advantage of solid sheet steel, serves to protect the system from vandalism. Advantageously a position sensor is assigned to the fronting door.

In yet another aspect of the invention a control means is provided which controls the drive unit of the at least two closing elements.

The invention will now be detailed by way of example embodiments illustrated in the drawing schematically in which.

Figure 1:
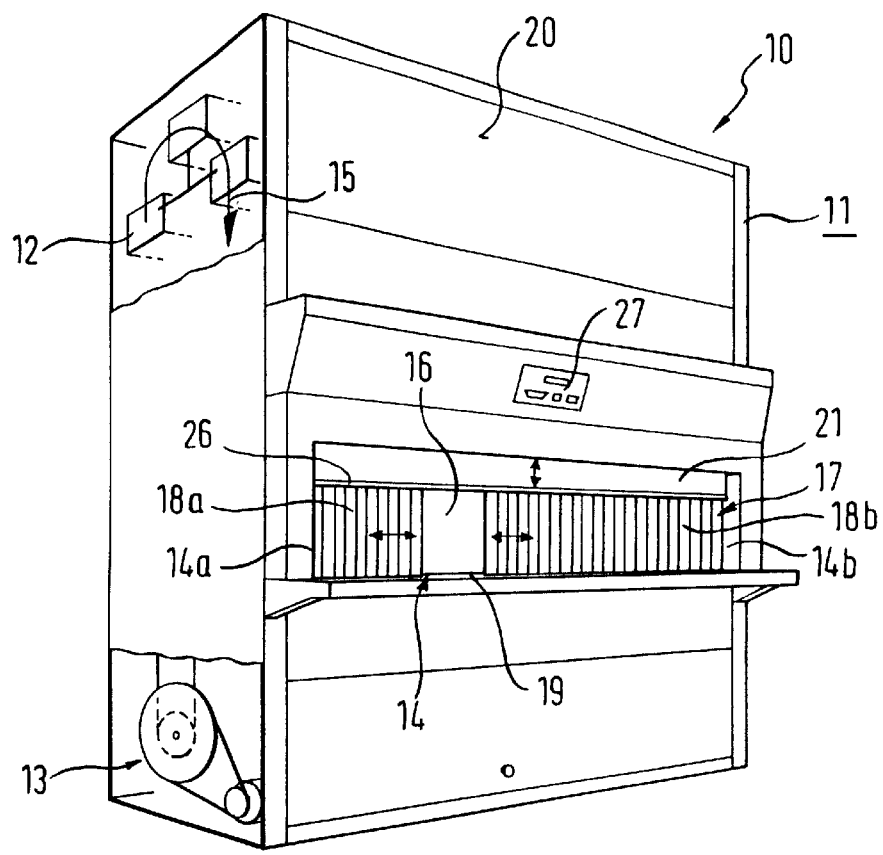
FIG. 1 is a view in perspective of a first embodiment in accordance with the invention.

Referring now to FIG. 1 there is illustrated in perspective a storage and retrieval system 10 including a rectangular housing 11. Provided in the housing 11 is a plurality of carriers 12 for accommodating stored items (not shown). The carriers 12 may be circulated by means of a transport device 13 in the direction of the arrow 15 or opposite thereto. The carriers are machined slotted for compartmenting optionally in width, height and depth by the user.

Provided at a front end 20 of the housing 11 is an access opening 14 to which each carrier 12 can be moved by means of the transport device 13. As evident from the illustration the access opening 14 is configured rectangular.

The access opening 14 is has a closing means 17 comprising two closing elements 18a, 18b arranged opposite each other and each horizontally shiftable on horizontal guide 19. Details of the closing means and its drive are described with reference to FIG. 2.

With the closing means 17 an access window 16 in the access opening 14 can be formed to prevent unauthorized access to other areas of the access opening 14. In this arrangement the closing elements 18a, 18b are spaced at a very small distance away from the carriers 12.

The closing means 17 is fronted by a vertically travelling door 21 constituting a full metal plate which totally covers the access opening in the closed position. The fronting door 21 enables the access window 16 to be defined from above. At its closing end the fronting door 21 is provided with a sensing guard 426 to prevent finger-trapping.

Figure 2:
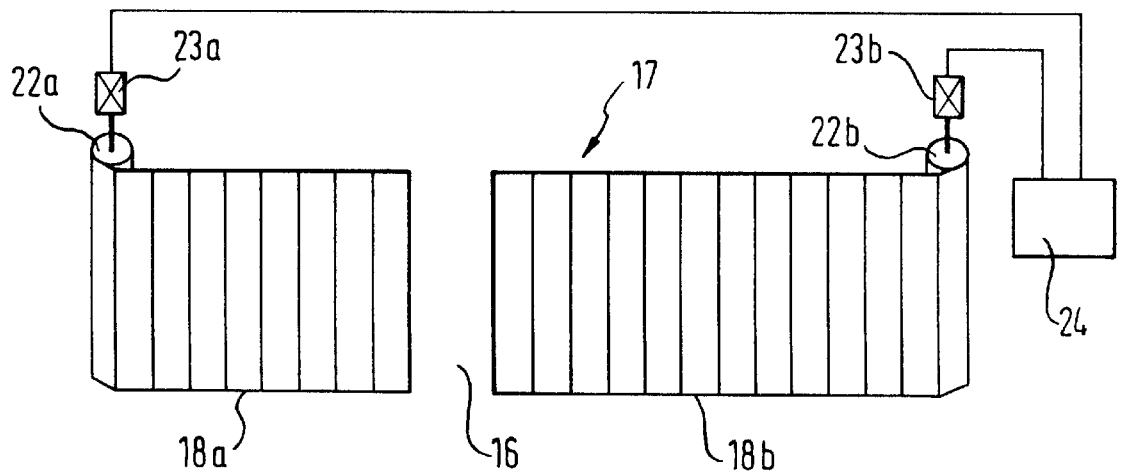
FIG. 2 is a detail illustration of the closing means of the embodiment as shown in FIG. 1.

Referring now to FIG. 2 there is illustrated schematically in detail the closing means 17 as shown in FIG. 1. As evident from the illustration each of the closing elements 18a, 18b is configured as a roller shutter, each winder mechanism 22a, 22b of which comprises a separate drive unit 23a, 23b including a position sensor. In this arrangement the drive unit 23a, 23b may be provided as a chain drive connected to the end member of the closing elements 18a, 18b. The closing elements 18a, 18b comprise a plurality of slats, each made of aluminium. However, other materials, for instance plastics materials, may be made use of, including see-thru plastics material to permit viewing the items in storage.

The drive units 23a, 23b of the winder mechanism 22a, 22b are electrically connected to a control means 24 to thus permit control of a desired access window 19 by infinitely horizontal assignment of the closing elements 18a, 18b at the access opening 14.

The functioning of the closing means 17 as shown in FIG. 1 will now be detailed.

In the starting position both the fronting door 21 and the closing elements 18a, 18b are in their closed position to thus close off the access opening 14 by both the fronting door 21 and by the closing elements 18a, 18b.

The operator identifies himself by means of an electronic operator control 27 (not shown in detail) for example by an ID and password permitting him dedicated access to a storage item through a dedicated access window 19.

Once the system recognizes the operator as authorized it first unlocks the fronting door 21. After this the closing elements 18a, 18b are operated via the assigned drive unit 23a, 23b to open a dedicated access window 16. The desired carrier 12 is run by means of the transport device 13 to the access opening 14, after which the fronting door 21 is elevated to the height as provided for so that the operator can retrieve the storage item.

The fronting door 21 closes, for example, on instruction by the operator or after the operator has left a dedicated monitored area, although it may also be provided for that the fronting door 21 closes on a timeout. Following the retrieval procedure the horizontally travelling closing elements 18a, 18b are travelled preferably to a center position.

It is not until the fronting door 21 has been closed that a new access cycle can be activated.

The access windows 16 are designated at the electronic operator control 27 manually by entering the positions of the closing elements 18a, 18b and of the fronting door 21.

Figure 3:
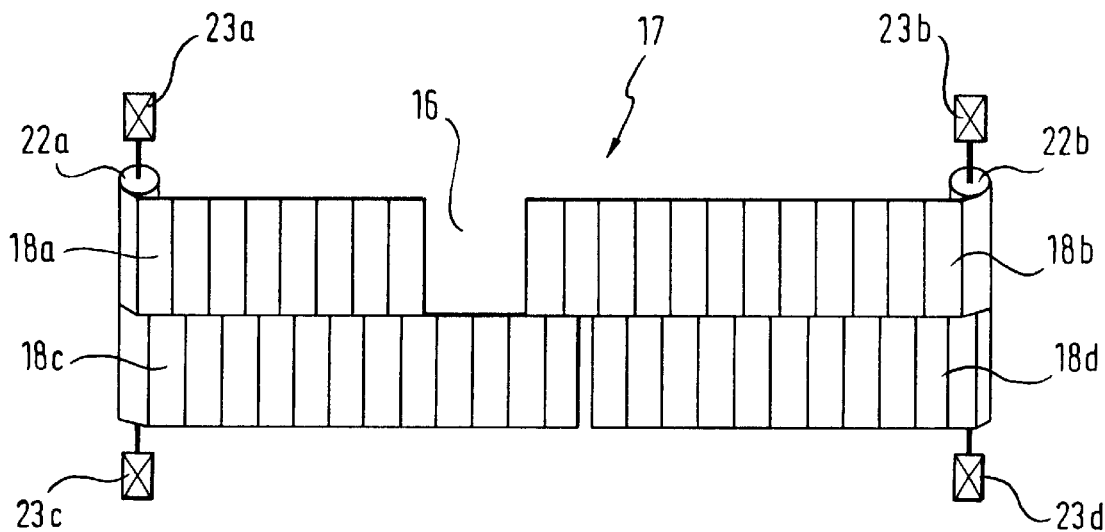
FIG. 3 is a detail illustration of the closing means of another embodiment.
Figure 4:
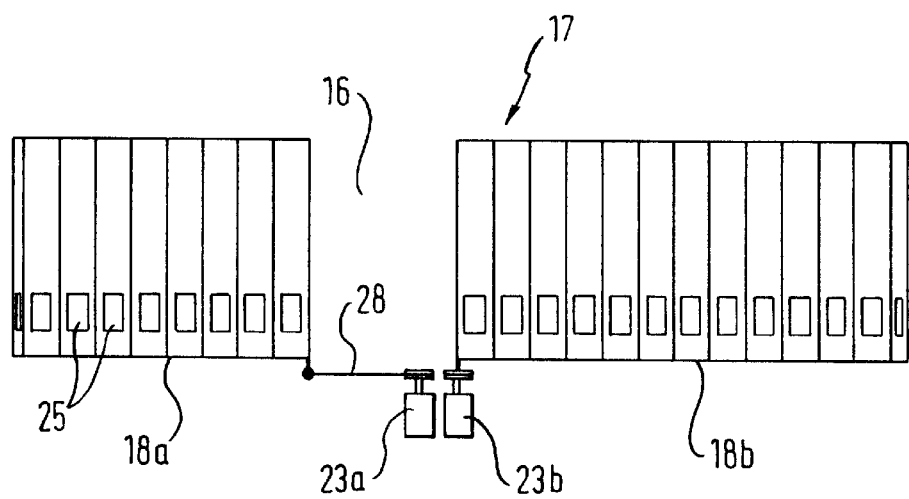
FIG. 4 is an illustration of the closing means of yet another embodiment in accordance with the invention.

Referring now to FIGS. 3 and 4 there are illustrated other variants of the closing means 17 in the following description of which like parts or like in function are identified by like reference numerals as already employed.

The closing means 17 as shown in FIG. 3 is made up of four closing elements 18a, 18b, 18c, 18d, each of which is configured as a roller shutter. Each closing element 18a, 18b, 18c, 18d comprises a winder mechanism 22a, 22b assigned a drive unit 23a, 23b, 23c, 23d.

As evident from the illustration each of the closing elements 18a, 18b, 18c, 18d is arranged horizontally shiftable, the closing elements 18a, 18b being positioned over the closing elements 18c, 18d to thus form an access window 16 defined both horizontally and vertically.

Referring now to FIG. 4 there is illustrated a further variant of a closing means 17 in which the closing elements 18a, 18b are configured as telescopic metal plates. Extension of the closing elements 18a, 18b is achieved by the drive unit 23a, 23b, each of which is assigned a closing element 18a, 18b. In this arrangement the drive means 23a, 23b are connected to the end portion of the closing elements 18a, 18b via conveying cables 28. Arranged in the telescopic metal plates is a viewing window 25.

Common to all embodiments of the closing means 17 in accordance with the invention is the uncomplicated structural design and equipping thereof, resulting in a small number of closing elements 18a, 18b, 18c, 18d being required.

What is claimed is:

1. A storage and retrieval system comprising;

a housing;

at least one access opening provided in said housing;

a plurality of carriers within the housing;

a transport device for moving a selected one of the plurality of carriers to the at least one access opening;

at least two separately controlled closing elements at the access opening arranged opposite each other and wherein each closing element comprises a separate drive unit connected to a controlled to form an access window at a selected position of the access opening.

2. The storage and retrieval system as set forth in claim 1, in which each closing element comprises a horizontal guide provided at said access opening.

3. The storage and retrieval system as set forth in claim 1 in which said at least two closing elements comprises a roller shutter.

4. The storage and retrieval system as set forth in claim 3, in which the roller shutter comprises a winder mechanism arranged at the sides of said access opening.

5. The storage and retrieval system as set forth in claim 1 in which said at least two closing elements comprises at least two telescopic metal plates.

6. The storage and retrieval system as set forth in claim 1 in which at least one of said at least two closing elements comprises a viewing window.

7. A storage and retrieval system comprising:

a housing;

at least one access opening provided in said housing;

a plurality of carriers within the housing;

a transport device for moving a selected one of the plurality of carriers to the at least one access opening;

at least two separately controlled closing elements at the access opening arrenged opposite each other;

and at least one vertically travelling door fronting said access opening.

* * * * *

UNITED STATES PATENT AND TRADEMARK OFFICE
CERTIFICATE OF CORRECTION

PATENT NO. : 6,450,598 B1
DATED : September 17, 2002
INVENTOR(S) : Hänel

It is certified that error appears in the above-identified patent and that said Letters Patent is hereby corrected as shown below:

Title page,
Item [57], ABSTRACT,
Line 3, delete the letter "y" and replace with -- by --.

Signed and Sealed this

Eleventh Day of March, 2003

JAMES E. ROGAN
*Director of the United States Patent and Trademark Office*